United States Patent Office 2,924,763
Patented Feb. 9, 1960

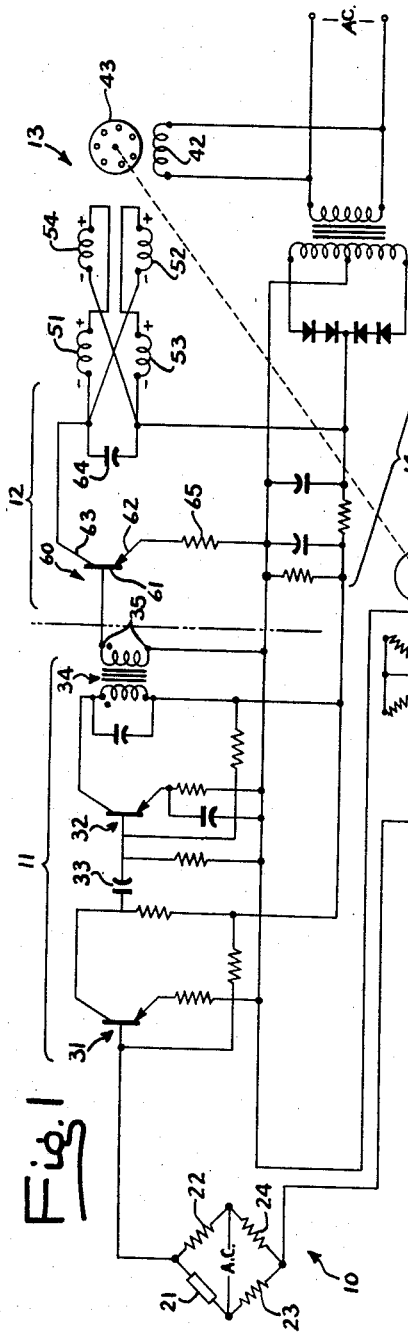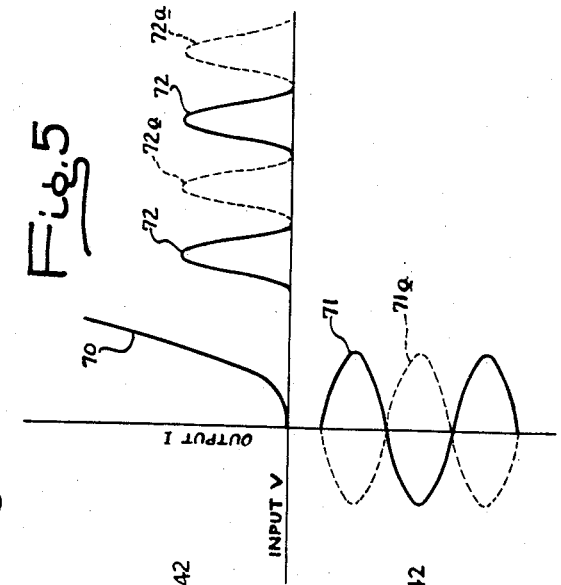

2,924,763
REVERSING MOTOR CONTROL SYSTEM

Charles A. Cibelius, Jr., Rockford, Ill., assignor to Barber-Colman Company, Rockford, Ill., a corporation of Illinois Application October 17, 1957, Serial No. 690,805

1 Claim. (Cl. 318—208)

The present invention relates to control systems for reversing motors and more particularly to the controlling of an A.-C. motor by means of shading windings.

It is an object of the invention to provide a motor control system for controlling the direction of rotation and the torque of a shaded pole motor and which is distinguished by high performance combined with small-package simplicity and compactness. It is another object to provide a motor control system which is capable of reliable operation over long periods of time in the controlling of temperature or other variable condition. It is an object related to the foregoing to provide an A.-C. reversing motor control system which has no electrical contacts but which is free from the disadvantages usually associated with non-contact or "static" control systems.

More specifically, it is an object of the invention to provide a novel combination of shaded pole motor and transistor in which the shading windings are supplied with half-waves of current from a single transistor. It is a related object to provide a transistor-fed motor arrangement which permits use of an inexpensive, low powered transistor and in which the power rating of the motor substantially exceeds the power rating of the transistor but without imposing more than a conservative load upon the transistor. It is another object to provide a transistor motor control circuit which insures that the transistor will not be subjected to induced voltages and in particular voltages exceeding the voltage rating of the transistor.

It is a further object of the invention to provide a novel control circuit for a reversing type shaded pole motor which is capable of using a stock motor and in which the windings are connected in a novel fashion to produce half-wave excitation while nevertheless maintaining a high output torque. Other objects and advantages of the invention will become apparent upon reading the attached detailed description and upon reference to the drawings, in which:

Figure 1 is a schematic diagram of a motor control system employing the present invention.

Fig 2 is a view in elevation of the motor used in Fig. 1.

Fig. 3 shows the shading windings connected in a manner characteristic of the prior art.

Fig. 4 shows an alternate connection for the shading windings.

Fig. 5 is a plot of the input and output currents of the transistor and showing the half-waves of current supplied to the shading windings.

While the invention has been described herein in connection with a preferred embodiment, it will be understood that the invention is not limited to such embodiment but includes such alternative and equivalent arrangements as may be included within the spirit and scope of the appended claim.

Turning to Figure 1 of the drawings, there is shown a preferred form of control arrangement embodying the present invention including a detector circuit 10, an amplifier 11, a motor supply circuit 12 and a motor 13, the direct voltage required for operating the amplifier and motor supply circuit being obtained from any suitable D.-C. supply 14. Coupled to the motor is a steam valve 15, damper, or other suitable condition controlling element. Associated with the condition controlling element is a follow-up circuit 16 which is preferably arranged in series with the detector circuit 10.

Turning to the input circuit of the amplifier 11 in greater detail, it will be noted that the detector circuit 10 is in the form of a temperature sensitive bridge comprising resistors 21—24 with the resistor 21 having a high temperature coefficient so that the output of the bridge varies substantially in response to temperature changes. The follow-up circuit 16 is formed of potentiometers 25, 26 connected in a bridge circuit and with the slider of the potentiometer 26 coupled to the valve 15. The overall arrangement is such that at the desired temperature or control point the outputs of the two bridge circuits are in bucking relation so that no A.-C. signal is fed to the amplifier 11, thus the motor remains stationary. However, upon departure of the temperature from the control point, this condition of balance is upset so that a net control voltage appears across the input of the amplifier which in turn causes the motor to be turned in one direction or the other, for corrective operation of the valve. The resulting movement of the slider of the potentiometer 26 restores the input voltage of the amplifier to zero so that the motor is brought to rest with the valve in an adjusted position.

With regard to the details of the amplifier 11, such amplifier is rather straightforward having transistors 31, 32 coupled by a capacitor 33, and with the output circuit of the transistor 32 being fed into a coupling transformer 34. The amplifier output voltage which appears across the terminals 35 of the transformer 34 is simply an amplified image of that appearing at the amplifier input and characterized by an impedance that is sufficiently low as to permit efficient excitation of the transistor input circuit which follows.

Prior to discussing the details of the motor supply circuit 12, it will be helpful to refer to Figure 2 which shows a reversible motor of the shading ring type, for example, as covered in Lilja Patent 2,010,869. This motor, indicated at 13, has a laminated core 41, a main winding 42, and a rotor 43. Arranged on the core 41 adjacent the rotor are a set of four shading windings 51, 52 and 53, 54. Conventionally, the shading windings of such a motor are connected as shown in Fig. 3 with the diagonally arranged windings 51, 52 in a first loop circuit and the diagonally arranged windings 53, 54 in a second loop circuit, the active loop circuit being selected by means of a single pole, double throw switch 55. The interconnected windings are poled so that the instantaneous voltages induced therein are additive creating a full wave, sinusoidal current about the closed loop having a phasing which unbalances the distribution of flux in the core thereby causing rotation of the rotor in one direction or the other.

In accordance with the present invention, at least one adjacent pair of the shading windings of the motor are oppositely poled and connected in series so that there is substantially zero induced voltage and the shading ring circuit thus formed is supplied with half wave pulses of voltage by a single transistor operating with little or no fixed bias, i.e., substantially in class C.

In the present embodiment, the transistor is indicated at 60 having an input circuit consisting of a base 61 and an emitter 62 and an output circuit which includes a collector 63, with the emitter as the common element. Connected in the output circuit are a first pair of adjacent windings 51, 54, connected in series and oppositely poled as regards instantaneous induced voltage. In the preferred embodiment, the second pair of adjacent windings 52, 53 are connected in series and arranged in parallel with respect to the windings 51, 54, again with polarities as indicated. It has been found that by paralleling the windings as shown, a maximum output torque may be achieved which is substantially as great as that obtainable when the motor is connected as originally intended by the motor designer (Fig. 3). It will be understood, however, that the invention is not limited to the particular connections shown in Fig. 2 but would also include use of a single pair of windings, i.e., 51, 54, or all four of the windings connected as shown in Fig. 4, with some loss of the maximum torque.

In the preferred embodiment, a capacitor 64, which may have a capacitance on the order of 25 mfd., is arranged in parallel with the shading windings for the purpose of improving the wave from and increasing the current therein by setting up a condition approaching parallel resonance. Also a series resistor 65 having a low resistance, say, on the order of 2.7 ohms, is included in the common or emitter leg of the transistor circuit in order to supply a small amount of variable bias thereby to stabilize the circuit for variations in transistors and in transistor temperature.

In order to understand the formation of the half cycle pulses of voltage supplied to the shading windings, reference is made to Fig. 5 which is a plot of output current as a result of input voltage and which is characteristic of common types of transistors. Superimposed upon the transistor characteristic 70 and alined with the vertical axis is the wave of input voltage 71. It will be noted that in the lack of fixed bias, appreciable input voltage must be present before any substantial output current may flow, resulting in a rather sharply peaked output wave. Only half waves 72 of current are produced in the output circuit since the current cuts off for all negative values of input voltage. Changing the phasing of the input wave as indicated at 71a causes a corresponding change in the phasing of the output half-waves 72a without, however, changing their polarity.

One unusual feature of the circuit is that the motor is capable of operating and of producing its rated maximum torque with only half-waves of current in the shading windings rather than the normal sinusoidal wave. It has also been found that with the transistor operating in the condition shown the transistor is capable of controlling motor wattage which greatly exceeds the wattage of the transistor. Thus, using a transistor of the type 2N242 or TS176, which are normally rated at about 1 watt at an operating temperature of 140° F., it is possible to control a motor control winding at about 4 watts, the latter being a common size of reversible shaded pole motor useful in the control of valves, dampers and the like. In addition, because of the novel polarization of the windings induced voltages are self-cancelling and are not applied to the transistor. This is of importance since such voltages may reach 30 volts or more, beyond the rating of conventional transistors. Consequently, it has been found possible to use low power, low cost transistors in place of power type transistors costing up to ten times as much and which normally would be thought necessary for power control purposes.

One of the features of the present construction is that the complete control unit may comprise a small and inexpensive package which avoids not only the bulk but also the disadvantages normally associated with conventional A.-C. reversible motor control. In the first place, no contacts are required. Moreover, because of the direct coupling between the single transistor 60 and the shading windings, the output transformer required in the usual two-phase system is made unnecessary. A high degree of reliability is achieved, making the arrangement suitable for military application. The system is distinguished in part by its novel utilization of a conventional production-run shaded pole motor and with all other components being conventional and non-critical.

It will be apparent that while the invention has been described in connection with a temperature control system, it is not limited thereto but is capable of being applied to the automatic control of other conditions with the necessary substitution being made for the detector 10 and condition-adjusting element 15.

The term "adjacent windings" as used in the following claims refers to those which are on the same side of the motor axis.

I claim as my invention:

A motor control system comprising in combination a shaded pole motor having a main winding with provision for connecting the same to an A.-C. source and having a set of four shading windings, the motor being of the type in which a selected pair of diagonally arranged windings are normally connected in a closed loop circuit with additive polarity to produce rotation of the motor rotor in one direction or the other, a transistor having an input circuit and an output circuit, a shading winding circuit connecting at least one adjacent pair of the windings in series and with the windings oppositely pole so that no net induced voltage results from rotation of the rotor, a source of direct voltage, the output of the transistor circuit being coupled to said shading winding circuit, means for supplying said input circuit with an A.-C. control signal derived from said A.-C. source but which is reversible in phasing and variable in magnitude, said shading winding circuit being connected directly in series with (a) said source of direct voltage and (b) the output circuit of said transistor so that the shading winding circuit is supplied with pulses of direct current from said transistor.

References Cited in the file of this patent

UNITED STATES PATENTS

| | | |
|---|---|---|
| 2,234,349 | MacKay | May 11, 1941 |
| 2,466,591 | Jacobson | Apr. 5, 1949 |
| 2,783,423 | Streater et al. | Feb. 26, 1957 |